US012718703B2

(12) United States Patent
Loh

(10) Patent No.: US 12,718,703 B2
(45) Date of Patent: Aug. 25, 2026

(54) DEVICE AND METHOD FOR RECOMMENDING EDUCATIONAL CONTENT

(71) Applicant: Socra AI Inc., Seoul (KR)

(72) Inventor: Hyun Bin Loh, Seoul (KR)

(73) Assignee: Socra AI Inc., Seoul (KR)

( * ) Notice: Subject to any disclaimer, the term of this patent is extended or adjusted under 35 U.S.C. 154(b) by 943 days.

(21) Appl. No.: 17/859,097

(22) Filed: Jul. 7, 2022

(65) Prior Publication Data

US 2023/0020808 A1 Jan. 19, 2023

(51) Int. Cl.
*G09B 7/04* (2006.01)
*G06Q 50/20* (2012.01)

(52) U.S. Cl.
CPC ............. *G09B 7/04* (2013.01); *G06Q 50/205* (2013.01)

(58) Field of Classification Search
None
See application file for complete search history.

(56) References Cited

FOREIGN PATENT DOCUMENTS

| | | | |
|---|---|---|---|
| JP | 2017-520068 | A | 7/2017 |
| JP | 2019-144504 | A | 8/2019 |
| KR | 10-2016-0009155 | A | 1/2016 |
| KR | 10-2016-0109913 | A | 9/2016 |
| KR | 10-2019-0123105 | A | 10/2019 |
| KR | 10-2213479 | B1 | 2/2021 |

*Primary Examiner* — James B Hull
(74) *Attorney, Agent, or Firm* — USX IP LLC

(57) ABSTRACT

Provided are a device and method for recommending educational content. The method includes acquiring a target user's learning data which includes log data including question data related to a question previously answered by the target user and answer data related to the target user's answer to the question, acquiring a question database including at least one candidate question, calculating the target user's predicted correct answer rate information for the candidate question on the basis of the candidate question and the learning data, acquiring the target user's ability information related to at least some of the log data, and determining recommendation content on the basis of the target user's ability information.

9 Claims, 8 Drawing Sheets

DEVICE AND METHOD FOR RECOMMENDING EDUCATIONAL CONTENT

CROSS-REFERENCE TO RELATED APPLICATION

This application claims priority to and the benefit of Korean Patent Application No. 2021-0090199, filed on Jul. 9, 2021, the disclosure of which is incorporated herein by reference in its entirety.

BACKGROUND

1. Field of the Invention

The present invention relates to a method, device, and system for recommending educational content. Specifically, the present invention relates to an educational content recommendation method, device, and system for calculating a user's ability information from the user's learning data and recommending educational content on the basis of the user's ability information.

2. Discussion of Related Art

With the development of artificial intelligence technology, an educational technology for diagnosing a user's learning ability and recommending educational content on the basis of the diagnosis result is attracting attention.

However, the related art is aimed at simply increasing a user's predicted score on a specific test. For example, research is under way mainly for the purpose of improving the accuracy of a technology for recommending educational content for increasing the score of a specific official test. Here, to increase the score of an official test, actual learning primarily involves concentration during a test and training for basic abilities required for learning such as improving a user's reasoning power.

In practice, however, there is not enough research on an educational content recommendation system for training basic abilities which are the bases of learning. Therefore, it is necessary to develop an educational content recommendation method, device, and system for training basic abilities required for learning.

SUMMARY OF THE INVENTION

The present invention is directed to providing an educational content recommendation method, device, and system for quantifying a user's various types of learning information.

The present invention is also directed to providing an educational content recommendation method, device, and system for recommending optimal educational content according to ability types.

Objects of the present invention are not limited to those described above, and other objects which have not been described above will be clearly understood by those of ordinary skill in the art from the specification and the accompanying drawings.

According to an aspect of the present invention, there is provided a method of recommending educational content, the method including acquiring a target user's learning data which includes log data including question data related to a question previously answered by the target user and answer data related to the target user's answer to the question, acquiring a question database including at least one candidate question, calculating the target user's predicted correct answer rate information for the candidate question on the basis of the candidate question and the learning data, acquiring the target user's ability information related to at least some of the log data on the basis of the predicted correct answer rate information, wherein the ability information is related to at least one of first information representing the target user's maximum learning ability, second information representing the target user's reasoning power, third information representing the target user's logical ability, and fourth information representing the target user's application ability, and determining recommendation content on the basis of the target user's ability information. The acquiring of the target user's ability information includes generating a growth curve related to the target user's predicted learning ability value on the basis of the learning data and the predicted correct answer rate information and acquiring the first information on the basis of the growth curve.

According to another aspect of the present invention, there is provided a device for recommending educational content by receiving a user's learning data from an external user terminal, the device including a transceiver configured to communicate with the user terminal and a controller configured to acquire a target user's learning data through the transceiver and calculate the target user's learning ability on the basis of the learning data. The controller acquires the target user's learning data which includes log data including question data related to a question previously answered by the target user and answer data related to the target user's answer to the question, acquires a question database including at least one candidate question, calculates the target user's predicted correct answer rate information for the candidate question on the basis of the candidate question and the learning data, acquires the target user's ability information related to at least some of the log data on the basis of the predicted correct answer rate information, wherein the ability information is related to at least one of first information representing the target user's maximum learning ability, second information representing the target user's reasoning power, third information representing the target user's logical ability, and fourth information representing the target user's application ability, and determines recommendation content on the basis of the target user's ability information. The controller generates a growth curve related to the target user's predicted learning ability value on the basis of the learning data and the predicted correct answer rate information and acquires the ability information by acquiring the first information on the basis of the growth curve.

Solutions to the objects of the present invention are not limited to those described above, and other solutions which have not been described above will be clearly understood by those of ordinary skill in the art from the specification and the accompanying drawings.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
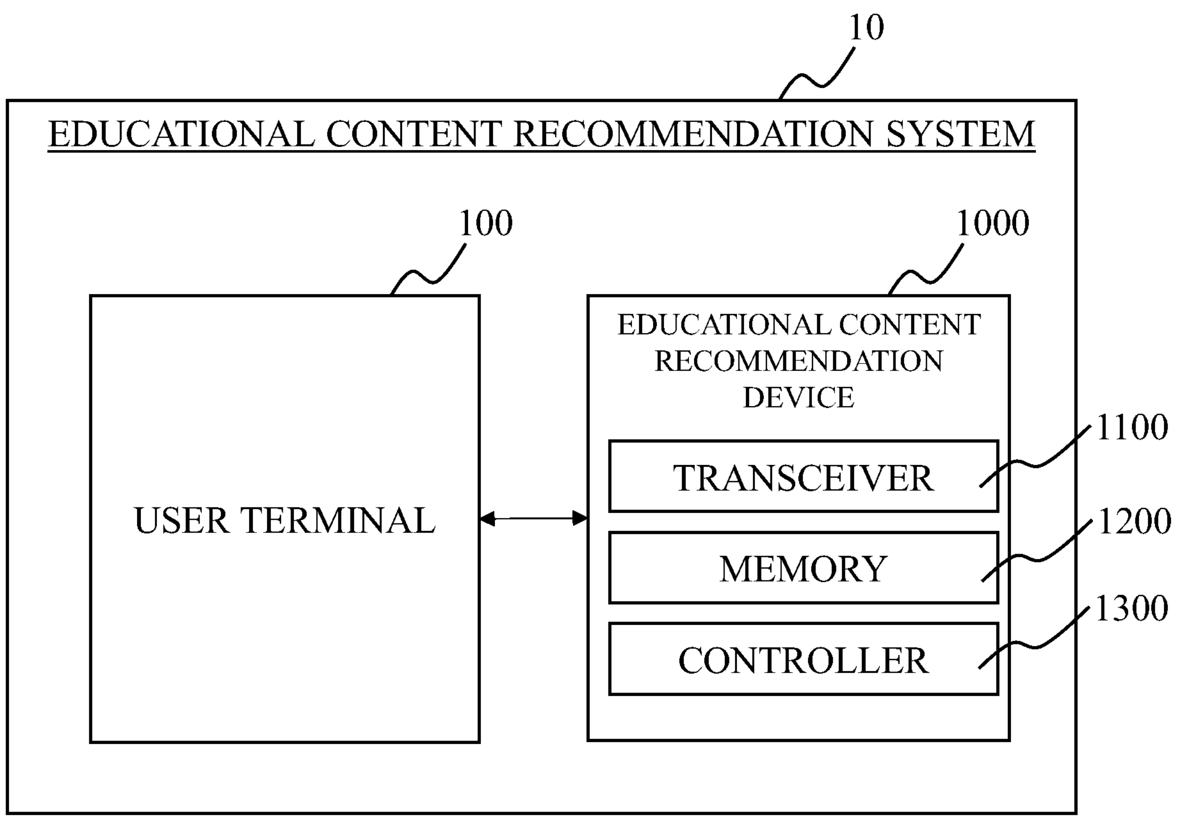
FIG. 1 is a block diagram schematically illustrating an educational content recommendation system according to an exemplary embodiment of the present invention.

The above-described objects, features, and advantages of the present invention will be apparent through the following detailed description related to the accompanying drawings. Since the present invention can be modified in various ways and have various embodiments, specific embodiments will be illustrated in the drawings and described in detail.

Throughout the specification, like reference numerals basically refer to like elements. Elements having the same function within the scope of the same idea shown in the drawings of each embodiment will be described using the same reference numerals, and overlapping descriptions thereof will be omitted.

When it is determined that a detailed description of a known function or element related to the present invention may unnecessarily obscure the subject matter of the present invention, the detailed description will be omitted. Also, numerals (e.g., first and second) used in the description of the specification are merely identifiers for distinguishing one element from another.

The suffixes "module" and "unit" for elements used in the following embodiments are given or interchangeably used in consideration of only the ease of drafting the specification and do not have a meaning or role distinct from each other.

In the following embodiments, the singular forms are intended to include the plural forms as well unless the context clearly indicates otherwise.

The terms "comprises," "comprising," "includes," "including," "has," "having," etc. mean the presence of features or elements stated herein and do not preclude the possibility of adding one or more other features or elements.

In the drawings, the sizes of elements may be exaggerated or reduced for the convenience of description. For example, the size and thickness of each element shown in the drawings are arbitrarily shown for the convenience of description, and thus the present invention is not necessarily limited to those shown in the drawings.

When a certain embodiment can be implemented differently, a specific process may be performed in a different order than that described. For example, two processes described in succession may be performed substantially simultaneously or performed in a reverse order of that described.

In the following embodiments, when elements and the like are referred to as being connected, the elements may be directly connected or indirectly connected with elements interposed therebetween.

For example, when elements and the like are referred to as being electrically connected herein, the elements and the like may be directly and electrically connected or may be indirectly and electrically connected with an element and the like interposed therebetween.

A method of recommending educational content according to an exemplary embodiment of the present invention may include an operation of acquiring a target user's learning data which includes log data including question data related to a question previously answered by the target user and answer data related to the target user's answer to the question, an operation of acquiring a question database including at least one candidate question, an operation of calculating the target user's predicted correct answer rate information for the candidate question on the basis of the candidate question and the learning data, an operation of acquiring the target user's ability information related to at least some of the log data on the basis of the predicted correct answer rate information, wherein the ability information is related to at least one of first information representing the target user's maximum learning ability, second information representing the target user's reasoning power, third information representing the target user's logical ability, and fourth information representing the target user's application ability, and an operation of determining recommendation content on the basis of the target user's ability information. The operation of acquiring the target user's ability information may include an operation of generating a growth curve related to the target user's predicted learning ability value on the basis of the learning data and the predicted correct answer rate information and an operation of acquiring the first information on the basis of the growth curve.

In the method, the operation of acquiring the first information on the basis of the growth curve may include an operation of acquiring rate-of-change information of the growth curve, an operation of acquiring target rate-of-change information having a rate of change smaller than or equal to a predetermined threshold rate of change on the basis of the rate-of-change information, and an operation of acquiring the first information on the basis of the predicted learning ability value corresponding to the target rate-of-change information.

In the method, the question database may include average correct answer rate information for the candidate question, and the operation of acquiring the target user's ability information may include acquiring the target user's second information by comparing the average correct answer rate information for the candidate question with the target user's predicted correct answer rate information for the candidate question.

In the method, the operation of acquiring the target user's second information may include an operation of acquiring a reference candidate question having an average correct answer rate lower than or equal to a predetermined reference correct answer rate and an operation of calculating the target user's second information by comparing the target user's predicted correct answer rate information for the reference candidate question with the average correct answer rate information for the reference candidate question.

In the method, the operation of determining the recommendation content may include an operation of acquiring an educational content set, an operation of calculating a predicted change in the ability information of the target user caused when content included in the educational content set is provided to the target user, and an operation of determining that the content which maximizes a predicted change in the ability information is the recommendation content.

In the method, the operation of determining the recommendation content may include an operation of determining a neural network model on the basis of the ability information, an operation of distributing resources corresponding to the determined model, and an operation of acquiring the recommendation content through the determined neural network model.

An exemplary embodiment of the present invention may provide a computer-readable recording medium on which a program for performing the method of recommending educational content is recorded.

A device for recommending educational content by receiving a user's learning data from an external user terminal according to an exemplary embodiment of the present invention may include a transceiver configured to communicate with the user terminal and a controller configured to acquire a target user's learning data through the transceiver and calculate the target user's learning ability on the basis of the learning data. The controller may acquire the target user's learning data which includes log data including question data related to a question previously answered by the target user and answer data related to the target user's answer to the question, acquire a question database including at least one candidate question, calculate the target user's predicted correct answer rate information for the candidate question on the basis of the candidate question and the learning data, acquire the target user's ability information related to at least some of the log data on the basis of the predicted correct answer rate information, wherein the ability information is related to at least one of first information representing the target user's maximum learning ability, second information representing the target user's reasoning power, third information representing the target user's logical ability, and fourth information representing the target user's application ability, and determine recommendation content on the basis of the target user's ability information. The controller may generate a growth curve related to the target user's predicted learning ability value on the basis of the learning data and the predicted correct answer rate information and acquire the ability information by acquiring the first information on the basis of the growth curve.

In the device, the controller may acquire rate-of-change information of the growth curve, acquire target rate-of-change information having a rate of change smaller than or equal to a predetermined threshold rate of change on the basis of the rate-of-change information, and acquire the first information on the basis of the predicted learning ability value corresponding to the target rate-of-change information.

In the device, the question database may include average correct answer rate information for the candidate question, and the controller may be configured to acquire the target user's second information by comparing the average correct answer rate information for the candidate question with the target user's predicted correct answer rate information for the candidate question and acquire the ability information.

In the device, the controller may acquire a reference candidate question having an average correct answer rate lower than or equal to a predetermined reference correct answer rate and calculate the target user's second information by comparing the target user's predicted correct answer rate information for the reference candidate question with the average correct answer rate information for the reference candidate question.

In the device, the controller may acquire an educational content set, calculate a predicted change in the ability information of the target user caused when content included in the educational content set is provided to the target user, and determine that content which maximizes a predicted change in the ability information is the recommendation content.

In the device, the controller may determine a neural network model on the basis of the ability information, distribute resources corresponding to the determined model, and acquire the recommendation content through the determined neural network model.

Hereinafter, an educational content recommendation method, device, and system of the present invention will be described with reference to FIGS. 1 to 8.

FIG. 1 is a block diagram schematically illustrating an educational content recommendation system according to an exemplary embodiment of the present invention.

An educational content recommendation system 10 according to the exemplary embodiment of the present invention may include a user terminal 100 and an educational content recommendation device 1000.

The user terminal 100 may acquire educational content from the educational content recommendation device 1000 or any external device. For example, the user terminal 100 may receive recommendation content determined by the educational content recommendation device 1000 and display the received recommendation content to the user through any output part. Subsequently, the user may input a response to the displayed recommendation content to the user terminal 100 through any input part.

The user terminal 100 may acquire learning data on the basis of the user's answer and transmit the user's learning data to the educational content recommendation device 1000. The learning data may encompass identification information of a question answered by the user, the user's answer information to the question, correct or incorrect answer information to the question, log data, etc. Meanwhile, the user terminal 100 may transmit user information to the educational content recommendation device 1000.

The educational content recommendation device 1000 according to the exemplary embodiment of the present invention may include a transceiver 1100, a memory 1200, and a controller 1300.

The transceiver 1100 may communicate with any external device including the user terminal 100. For example, the educational content recommendation device 1000 may receive the learning data and/or user information of the user from the user terminal 100 through the transceiver 1100 or transmit the recommendation content to the user terminal 100 through the transceiver 1100.

The educational content recommendation device 1000 may access a network through the transceiver 1100 to transmit and receive various pieces of data. The transceiver 1100 may be a wired type or a wireless type. Since each of the wired type and the wireless type has advantages and disadvantages, both the wired type and the wireless type may be provided in the educational content recommendation device 1000 in some cases. The wireless type may employ a wireless local area network (WLAN)-based communication method such as Wi-Fi. Alternatively, the wireless type may employ cellular communication, for example, Long Term Evolution (LTE) or fifth generation (5G) communication. However, a wireless communication protocol is not limited to the above-described examples, and any appropriate wireless communication method may be used.

The wired type representatively employs, for example, LAN or universal serial bus (USB) communication and may also employ other communication methods.

The memory 1200 may store various pieces of information. In the memory 1200, various pieces of data may be temporarily or semi-permanently stored. Examples of the memory 1200 include a hard disk driver (HDD), a solid state drive (SSD), a flash memory, a read-only memory (ROM), a random access memory (RAM), etc. The memory 1200 may be provided in a form that is embedded in or detachable from the educational content recommendation device 1000. The memory 1200 may store an operating system (OS) for running the educational content recommendation device 1000, a program for operating each element of the educational content recommendation device 1000, and various pieces of data required for operations of the educational content recommendation device 1000.

The controller 1300 may control the overall operation of the educational content recommendation device 1000. For example, the controller 1300 may control an operation of acquiring a candidate question and average correct answer rate information from a question database, an operation of calculating a user's predicted correct answer rate information for the candidate question on the basis of the candidate question and the user's learning data, an operation of acquiring the user's ability information on the basis of the predicted correct answer rate information and the average correct answer rate information, an operation of acquiring recommendation content on the basis of the user's ability information, etc., which will be described below. Specifically, the controller 1300 may load a program for the overall operation of the educational content recommendation device 1000 from the memory 1200 and run the program. The controller 1300 may be implemented as an application processor (AP), a central processing unit (CPU), or a similar device on the basis of hardware, software, or a combination of hardware and software. As hardware, the controller 1300 may be provided in the form of an electronic circuit for processing an electrical signal to perform a control function. As software, the controller 1300 may be provided in the form of a program or code for operating a hardware circuit.

Operations of the educational content recommendation device 1000 according to the exemplary embodiment of the present invention will be described in detail below with reference to FIGS. 2 to 8.

The educational content recommendation device 1000 according to the exemplary embodiment of the present invention may perform an operation of recommending educational content on the basis of a user's learning data.

The related art is aimed at simply increasing a user's predicted score of a specific test. For example, research is under way mainly for the purpose of improving the accuracy of a technology for recommending educational content for increasing the score of a specific official test. Here, to increase the score of an official test, actual learning primarily involves concentration during a test and training for basic abilities required for learning such as improving a user's reasoning power. In practice, however, there is not enough research on an educational content recommendation system for training basic abilities which are the bases of learning.

The educational content recommendation device 1000 according to the exemplary embodiment of the present invention may assess basic abilities (e.g., a learning ability, reasoning power, a logical ability, an application ability, a basic academic ability, concentration, and grit) on the basis of a user's learning data and determine recommendation content according to an ability type on the basis of the assessment, and thus the user can be provided with optimal training for various abilities related to learning.

Figure 2:
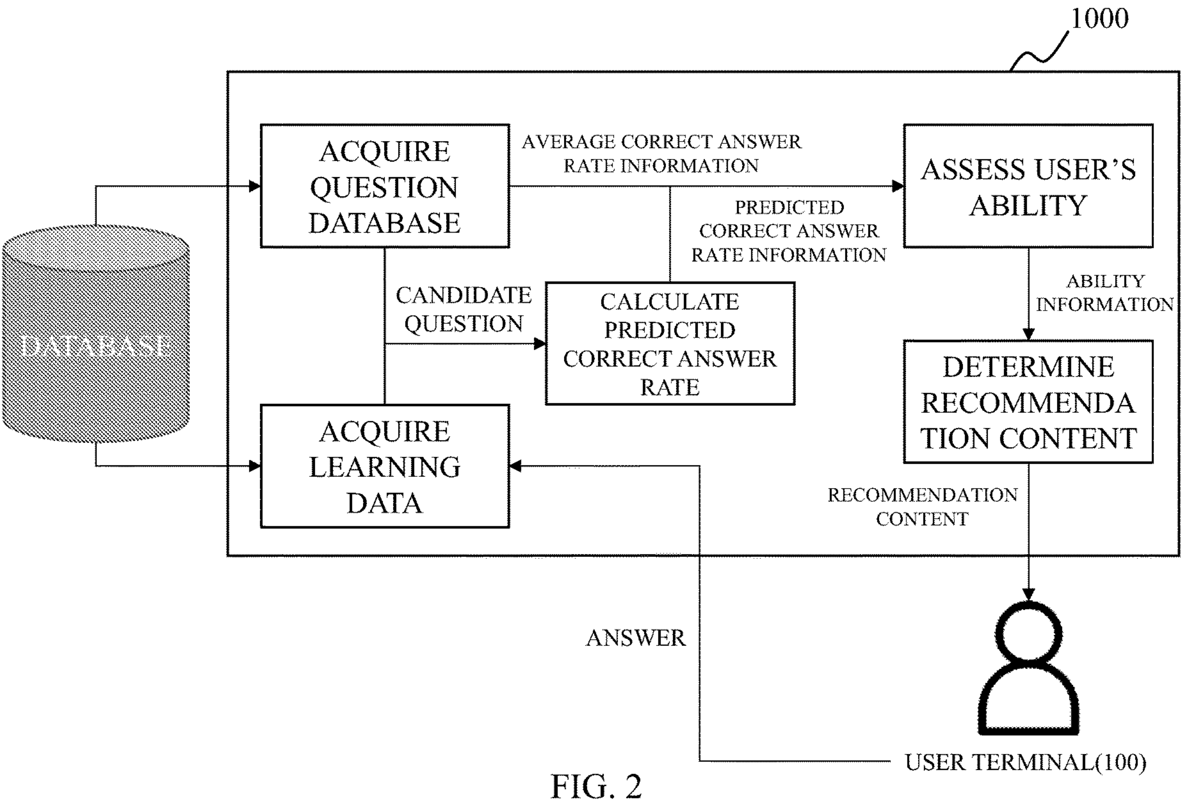
FIG. 2 is a diagram illustrating operations of an educational content recommendation device according to an exemplary embodiment of the present invention.

Operations of the educational content recommendation device 1000 for achieving the above-described objects and effects according to the exemplary embodiment of the present invention will be described in detail below with reference to FIG. 2. FIG. 2 is a diagram illustrating operations of the educational content recommendation device 1000 according to the exemplary embodiment of the present invention.

The educational content recommendation device 1000 according to the exemplary embodiment of the present invention may acquire a question database from any database. The question database may include information on at least one candidate question and average correct answer rate information of the candidate question.

The educational content recommendation device 1000 according to the exemplary embodiment of the present invention may acquire a user's learning data from a database. As described above, the learning data may encompass any data related to the user's learning such as identification information of a question previously answered by the user, the user's answer information to the question, and/or correct and incorrect answer information. For example, the learning data may include log data including question data related to the question previously answered by the user and answer data related to the user's answer to the question.

The educational content recommendation device 1000 according to the exemplary embodiment of the present invention may include learning data including the user's answer information acquired through the user terminal 100.

The educational content recommendation device 1000 according to the exemplary embodiment of the present invention may calculate information on a candidate question acquired from the question database and the user's predicted correct answer rate for the candidate question. To calculate the predicted correct answer rate, various artificial neural network models including a recurrent neural network (RNN), a long short-term memory (LSTM) network, a bidirectional LSTM network, or a transformer-based artificial neural network. In addition to artificial neural network models, any appropriate algorithm may be used.

The educational content recommendation device 1000 according to the exemplary embodiment of the present invention may perform an operation of assessing or calculating the user's learning ability. For example, the educational content recommendation device 1000 may calculate ability information by assessing the user's learning ability on the basis of the user's learning data. The ability may encompass the user's learning-related abilities, such as the user's current scores and predicted scores on various official tests, reasoning power, logical ability, application ability, basic academic ability, grit, concentration, and latent ability, which may be diagnosed using any method. Also, the ability information may encompass information obtained by quantifying the user's leaning-related diagnosable abilities described above and any form of information for quantifying the user's abilities.

The educational content recommendation device 1000 according to the exemplary embodiment of the present invention may acquire the user's ability information on the basis of the user's learning data and the question database.

A method of calculating the user's ability information will be described in detail below with reference FIGS. 4 to 8.

The educational content recommendation device 1000 according to the exemplary embodiment of the present invention may perform an operation of determining recommendation content on the basis of ability information.

Figure 3:
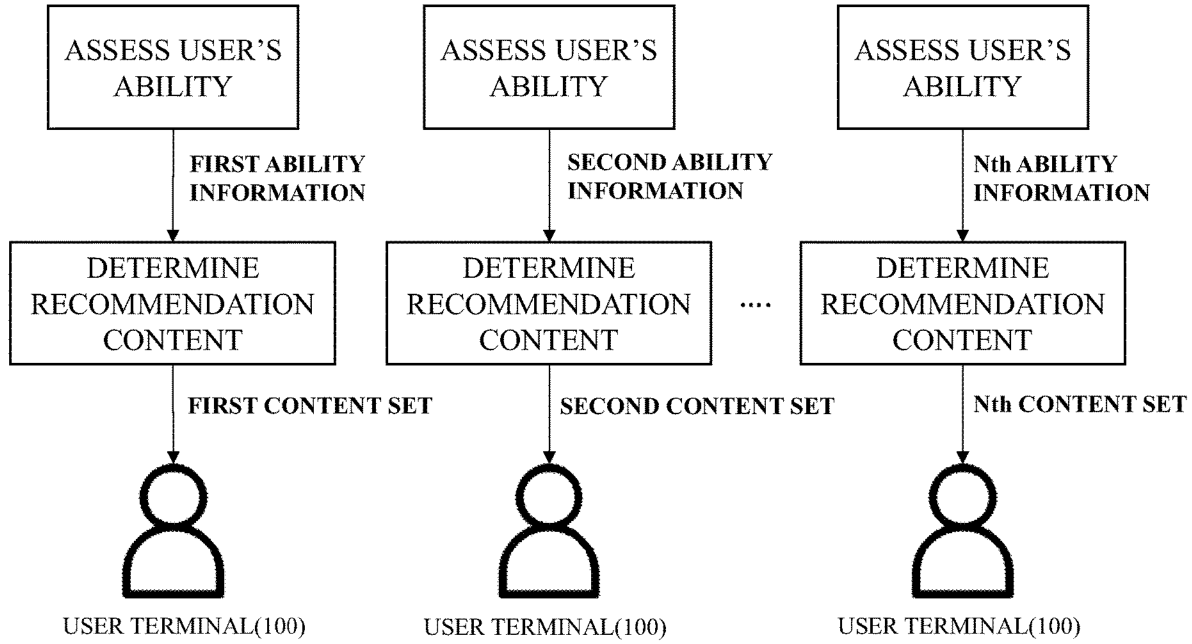
FIG. 3 is a diagram illustrating an aspect of recommendation content determined on the basis of types of ability information according to an exemplary embodiment of the present invention.

See FIG. 3. FIG. 3 is a diagram illustrating an aspect of recommendation content determined on the basis of types of ability information according to an exemplary embodiment of the present invention.

As an example, when a first type of first ability information representing a user's learning ability is acquired, the educational content recommendation device 1000 may generate a first content set by associating the first ability information with data at a specific point of log data included in the user's learning data and determine that the first content set is recommendation content. The first content set may be educational content which is beneficial to improve a maximum learning ability related to the user's first ability information.

As another example, when a second type of second ability information representing a user's reasoning power is acquired, the educational content recommendation device 1000 may generate a second content set by associating the second ability information with data at a specific point of log data included in the user's learning data and determine that the second content set is recommendation content. The second content set may be educational content which is beneficial to improve a reasoning power related to the user's second ability information.

As still another example, when a third type of third ability information representing a user's logical ability is acquired, the educational content recommendation device 1000 may generate a third content set by associating the third ability information with data at a specific point of log data included in the user's learning data and determine that the third content set is recommendation content. The third content set may be educational content which is beneficial to improve a logical ability related to the user's third ability information.

As yet another example, when a fourth type of fourth ability information representing a user's application ability is acquired, the educational content recommendation device 1000 may generate a fourth content set by associating the fourth ability information with data at a specific point of log data included in the user's learning data and determine that the fourth content set is recommendation content. The fourth content set may be educational content which is beneficial to improve an application ability related to the user's fourth ability information.

However, the above-described types of ability information are merely exemplary, and the educational content recommendation device 1000 may acquire information on any learning-related ability such as grit (an ability related to fighting spirit, or courage) and concentration, and determine that a content set for maximizing the ability is recommendation content.

Meanwhile, the educational content recommendation device 1000 according to the exemplary embodiment of the present invention may determine recommendation content on the basis of predicted correct answer rate information. The recommendation content may be educational content which maximizes a predicted score calculated from the predicted correct answer rate information.

According to the exemplary embodiment, the educational content recommendation device 1000 may use a learning level to calculate an expected score which is a base for determining recommendation content. The learning level may include information on educational effects produced when a user learns educational content such as reading a solution to a candidate question or listening to a relevant lecture. For example, an expected score reflecting a learning level may be calculated by adding "a value obtained by multiplying the learning level and a maximum predicted score together" and "a value obtained by multiplying a non-learning level and an expected score not reflecting the learning level."

Referring back to FIG. 2, the educational content recommendation device 1000 according to the exemplary embodiment of the present invention may transmit the recommendation content to the user terminal 100 through the transceiver 1100.

The user terminal 100 may display a response to the recommendation content through any input part. The user's input may be updated in the learning data and stored in the database or any storage device.

Meanwhile, although not shown in FIG. 2, the educational content recommendation device 1000 according to the exemplary embodiment of the present invention may perform an operation of calculating the user's predicted score on the basis of the user's learning data for each case in which a specific question is answered correctly or incorrectly. The predicted score of the case in which the specific question is correctly answered may be the maximum predicted score, and the predicted score of the case in which the specific question is incorrectly answered may be the minimum predicted score. The user's learning data may be updated in real time every time the user answers a question. The user's calculated predicted score may be used in calculating an expected score.

Figure 4:
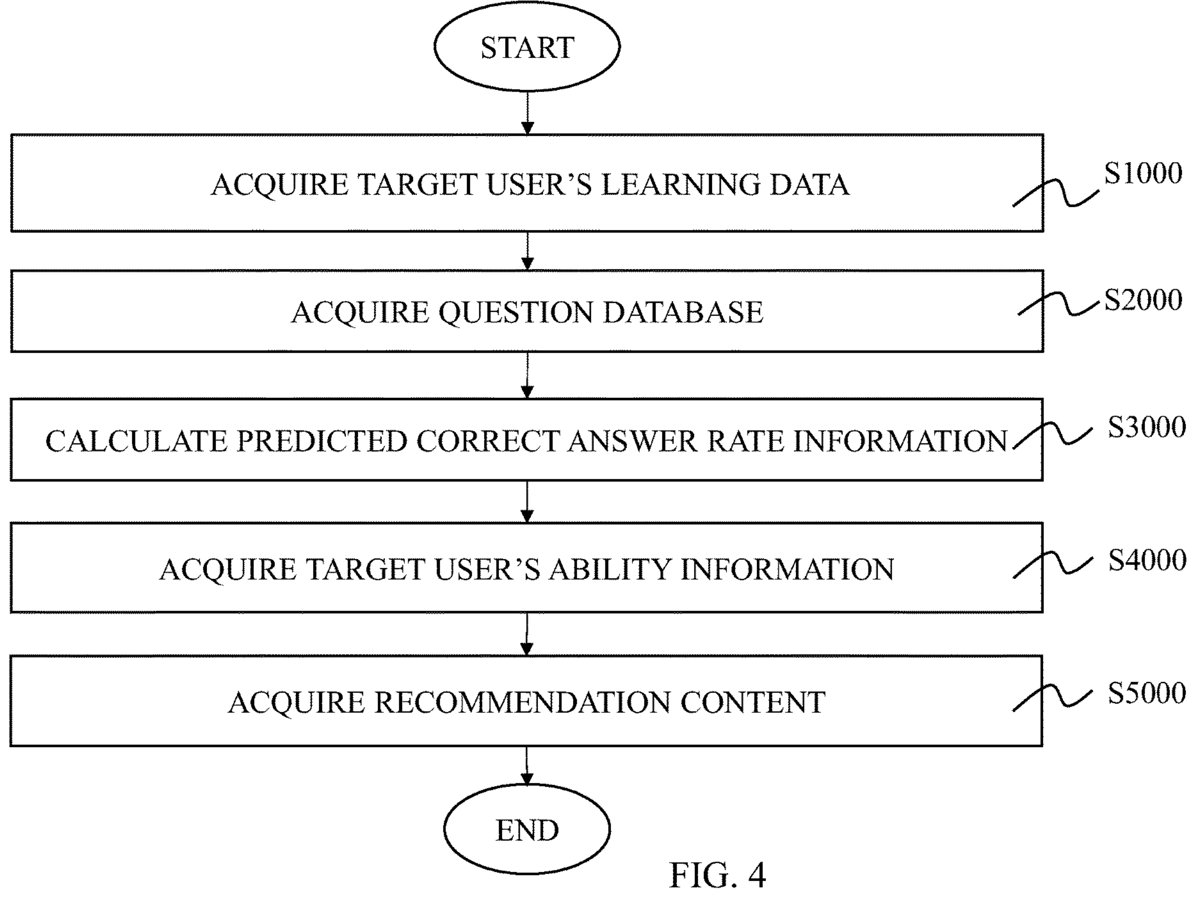
FIG. 4 is a flowchart illustrating a method of recommending educational content according to an exemplary embodiment of the present invention.

FIG. 4 is a flowchart illustrating a method of recommending educational content according to an exemplary embodiment of the present invention. The method of recommending educational content according to the exemplary embodiment of the present invention may include an operation S1000 of acquiring a target user's learning data, an operation S2000 of acquiring a question database, an operation S3000 of calculating predicted correct answer rate information, an operation S4000 of acquiring the target user's ability information, and an operation S5000 of acquiring recommendation content.

In the operation S1000 of acquiring the target user's learning data, the educational content recommendation device 1000 may acquire learning data from the database. Specifically, the educational content recommendation device 1000 may be implemented to recognize the target user's user information and acquire learning data related to the target user from the database. Alternatively, the educational content recommendation device 1000 may acquire the target user's learning data from a response received from the user terminal 100. As described above, the learning data may encompass identification information of a question answered by the user, the user's answer information to the question, correct or incorrect answer information, etc.

Alternatively, the learning data may include the target user's chronological score information. For example, the learning data may include first score information at a first time point and/or second score information at a second time point. For specific example, the first score information may be the target user's score on an official test (e.g., test of English for international communication (TOEIC), scholastic aptitude test (SAT), or Korean college scholastic aptitude test (CSAT)) at a first time point. The second score information may be the target user's score information on an official test (e.g., TOEIC, SAT, or Korean CSAT) at a second time point. However, these are merely exemplary, and the learning data may encompass the user's any learning-related data, such as the user's current scores and predicted scores on various official tests, reasoning power, logical ability, application ability, basic academic ability, concentration, grit, and latent ability, that may be diagnosed using any method.

In the operation S2000 of acquiring the question database, the educational content recommendation device 1000 may acquire a question database. The question database may include at least one candidate question and reference users' average correct answer rate information for the candidate question.

In the operation S3000 of calculating the predicted correct answer rate information, the educational content recommendation device 1000 may calculate the target user's predicted correct answer rate for a candidate question on the basis of the target user's learning data and the candidate question acquired from the question database. Specifically, the educational content recommendation device 1000 may predict the target user's correct answer rate for the candidate question on the basis of the target user's learning data. To predict the correct answer rate, various artificial neural network models including an RNN, an LSTM network, a bidirectional LSTM network, or a transformer-based artificial neural network may be used. For example, when a transformer-based artificial neural network is used in acquiring a predicted correct answer rate for the candidate question, candidate question information may be input to an encoder, and the target user's learning data (e.g., answer information) may be input to a decoder such that the target user's predicted correct answer rate is acquired for the candidate question.

In the operation S4000 of acquiring the target user's ability information, the educational content recommendation device 1000 may assess or quantify the user's ability on the basis of the target user's predicted correct answer rate information for the candidate question and the reference users' average correct answer rate information for the candidate question.

For example, the educational content recommendation device 1000 may quantify first ability information representing the target user's maximum learning ability on the basis of the target user's predicted correct answer rate information for the candidate question and the reference users' average correct answer rate information for the candidate question. Specifically, the educational content recommendation device 1000 may generate a growth curve related to the target user's predicted learning ability value on the basis of the predicted correct answer rate information and/or the average correct answer rate information and calculate first ability information related to the target user's maximum learning ability on the basis of the growth curve. A method of calculating first ability information will be described in detail below with reference to FIGS. 5 and 6.

Figure 5:
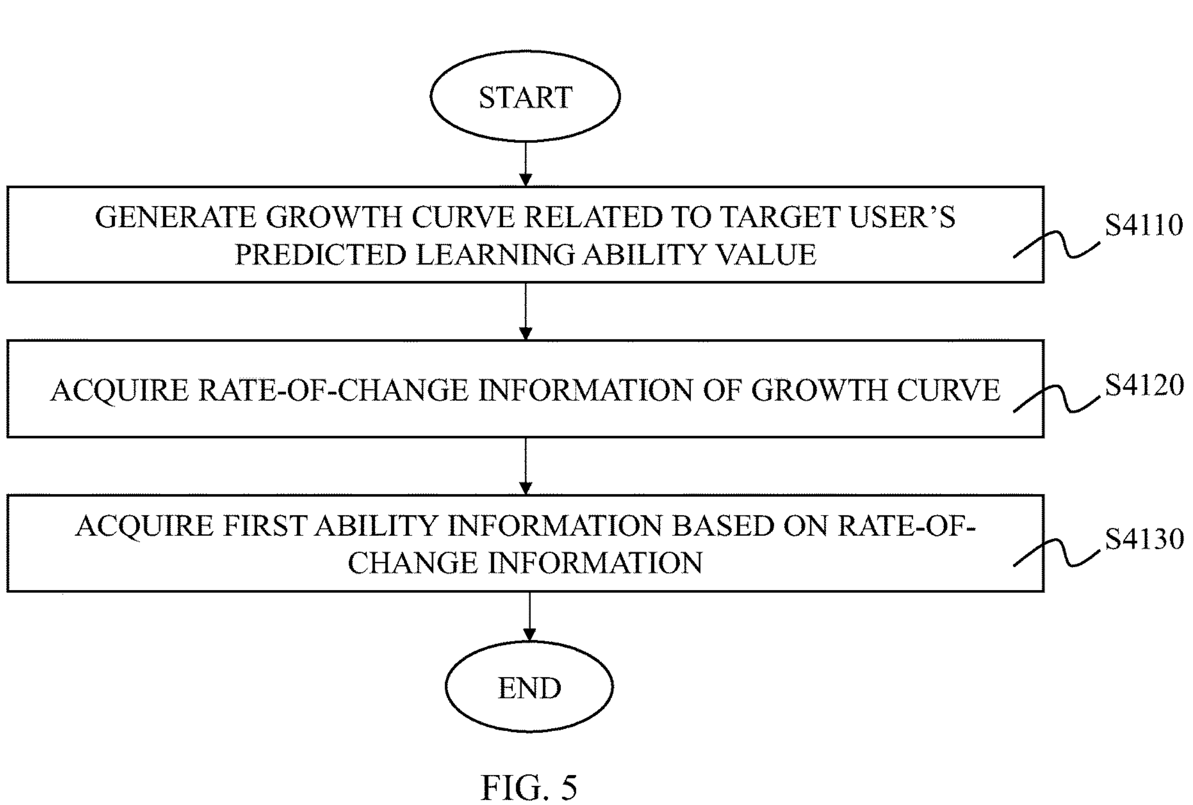
FIG. 5 is a detailed flowchart illustrating a method of acquiring first ability information related to a target user's maximum learning ability according to an exemplary embodiment of the present invention.
Figure 6:
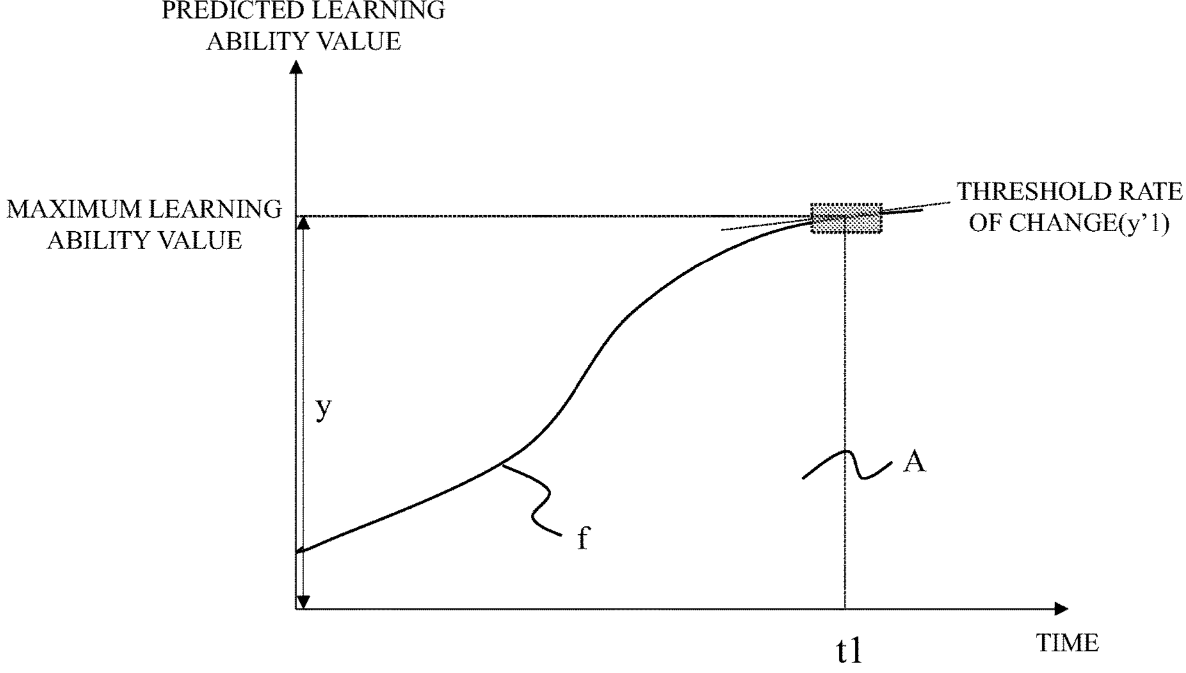
FIG. 6 is a graph illustrating an aspect of acquiring a target user's first ability information according to an exemplary embodiment of the present invention.

FIG. 5 is a detailed flowchart illustrating a method of acquiring first ability information related to a target user's maximum learning ability according to an exemplary embodiment of the present invention. FIG. 6 is a graph illustrating an aspect of acquiring a target user's first ability information according to an exemplary embodiment of the present invention.

The operation S4000 of acquiring the target user's ability information may include an operation S4110 of generating a growth curve related to the target user's predicted learning ability value, an operation S4120 of acquiring rate-of-change information of the growth curve, and an operation S4130 of acquiring first ability information on the basis of the rate-of-change information.

In the step S4110 of generating the growth curve related to the target user's predicted learning ability value, the educational content recommendation device 1000 may acquire a growth curve f related to the target user's predicted learning ability value on the basis of the target user's predicted correct answer rate information for the candidate question or the reference users' average correct answer rate information for the candidate question. More specifically, the educational content recommendation device 1000 may calculate the target user's predicted learning ability value on the basis of the predicted correct answer rate information for each case in which a specific question is answered correctly or incorrectly. Also, the educational content recommendation device 1000 may generate the growth curve f related to the target user's predicted learning ability value on the basis of the calculated predicted learning ability value.

As another example, the educational content recommendation device 1000 may generate a growth curve related to the target user's predicted learning ability value. For example, the educational content recommendation device 1000 may be implemented to generate the growth curve f on the basis of answer information to a question previously answered by the target user, correct or incorrect answer information, or the target user's score information. More specifically, the educational content recommendation device 1000 may be implemented to predict a probability distribution related to the target user's predicted learning ability value using the target user's first score information at the first time point, the target user's second score information at the second time point, and the target user's learning data between the first time point and the second time point. Also, the educational content recommendation device 1000 may generate the growth curve f related to the user's predicted learning ability value on the basis of the predicted probability distribution.

The educational content recommendation device 1000 may predict the user's learning ability value using any algorithm and/or trained neural network model and generate the growth curve f related to the predicted learning ability value.

In the operation S4120 of acquiring the rate-of-change information of the growth curve, the educational content recommendation device 1000 may calculate rate-of-change information from the growth curve f. As an example, the educational content recommendation device 1000 may acquire a first-order derivative f' of the growth curve f and calculate rate-of-change information y' from the first-order derivative f'. As another example, the educational content recommendation device 1000 may acquire a second-order derivative f" of the growth curve f and calculate rate-of-change information y" from the second-order derivative f".

In the operation S4130 of acquiring the first ability information on the basis of the rate-of-change information, the educational content recommendation device 1000 may calculate first ability information representing the target user's maximum learning ability on the basis of the rate-of-change information.

As an example, the educational content recommendation device 1000 may acquire first rate-of-change information y'1 that is the rate-of-change information y' smaller than or equal to a predetermined rate of change. The educational content recommendation device 1000 may determine that the target user's predicted learning ability value at a time point t1 corresponding to the first rate-of-change y'1 is first ability information representing the maximum learning ability.

As another example, the educational content recommendation device 1000 may calculate rate-of-change information y" which represents how the rate-of-change y' of the growth curve f is reduced and acquire second rate-of-change information that is the rate-of-change information y" smaller than or equal to a predetermined value. The educational content recommendation device 1000 may determine that the target user's predicted learning ability value at a time point corresponding to the second rate-of-change information is first ability information representing the maximum learning ability.

However, the process of calculating first ability information on the basis of rate-of-change information is merely exemplary, and the educational content recommendation device 1000 may be implemented to calculate first ability information representing the target user's maximum learning ability value using any appropriate method. For example, the educational content recommendation device 1000 may calculate first ability information on the basis of area information A of the growth curve f. As a specific example, the educational content recommendation device 1000 may calculate first ability information representing the target user's maximum learning ability value on the basis of the area information A of the generated growth curve f and the predicted learning ability value y. For example, when a ratio (A/y) of the area information A to the predicted learning ability value y has a first value, the educational content recommendation device 1000 may allocate first ability information including a first maximum learning ability value to the target user. When the ratio (A/y) of the area information A to the predicted learning ability value y has a second value, the educational content recommendation device 1000 may allocate first ability information including a second maximum learning ability value to the target user.

FIGS. 5 and 6 mainly illustrate the process of generating a growth curve related to a target user's predicted learning ability value and acquiring first ability information on the basis of the growth curve. However, this is merely exemplary for the convenience of description, and first ability information related to a target user's maximum learning ability may be acquired on the basis of any appropriate method.

Referring back to FIG. 4, in the operation S4000 of acquiring the target user's ability information, the educational content recommendation device 1000 may assess or quantify the target user's ability on the basis of the target user's predicted correct answer rate information for the candidate question and the reference users' average correct answer rate information for the corresponding candidate question.

For example, the educational content recommendation device 1000 may quantify second ability information representing the target user's reasoning power on the basis of the target user's predicted correct answer rate information for the candidate question and/or the reference users' average correct answer rate information for the candidate question. Specifically, the educational content recommendation device 1000 may arrange candidate questions of the question database in order of average correct answer rate on the basis of average correct answer rate information. Also, the educational content recommendation device 1000 may acquire a reference candidate question on the basis of a predetermined reference correct answer rate and calculate second ability information related to the target user's reasoning power by comparing the target user's predicted correct answer rate information for the reference candidate question with the reference users' average correct answer rate information for the reference candidate question. A method of calculating second ability information will be described in detail below with reference to FIGS. 7 and 8.

Figure 7:
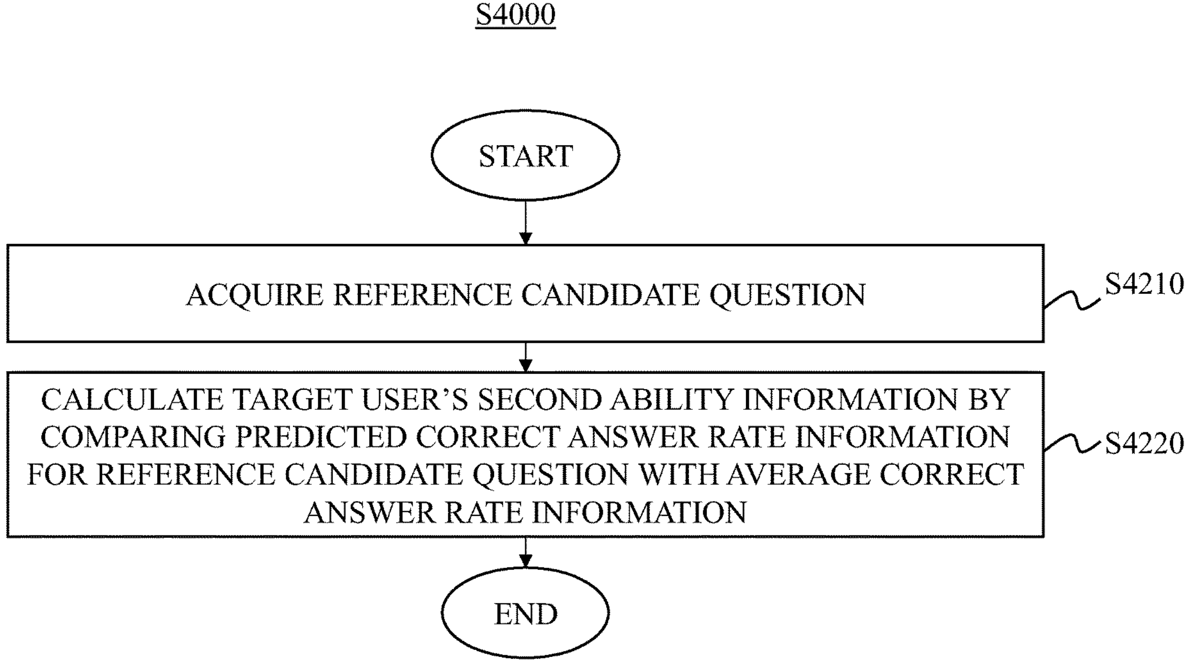
FIG. 7 is a detailed flowchart illustrating a method of acquiring second ability information related to a target user's reasoning power according to an exemplary embodiment of the present invention.
Figure 8:
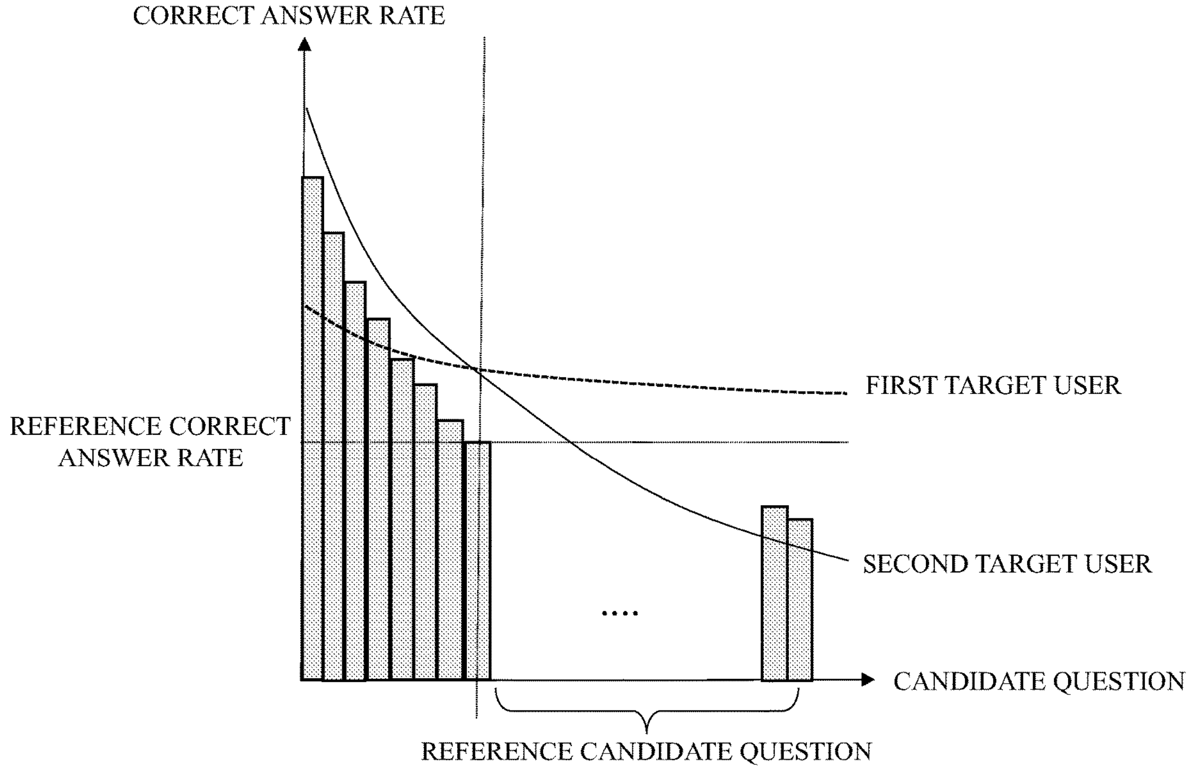
FIG. 8 is a graph illustrating an aspect of calculating a target user's second ability information according to an exemplary embodiment of the present invention.

FIG. 7 is a detailed flowchart illustrating a method of acquiring second ability information related to a target user's reasoning power according to an exemplary embodiment of the present invention. FIG. 8 is a graph illustrating an aspect of calculating a target user's second ability information according to an exemplary embodiment of the present invention.

The operation S4000 of acquiring the target user's ability information, particularly, second ability information, may include an operation S4210 of acquiring a reference candidate question and an operation S4220 of calculating the target user's second ability information by comparing the target user's predicted correct answer rate information with the reference users' average correct answer rate information for the reference candidate question.

In the operation S4210 of acquiring the reference candidate question, the educational content recommendation device 1000 according to the exemplary embodiment of the present invention may acquire at least one candidate question from the question database and the reference users' average correct answer rate information for the reference question. Also, the educational content recommendation device 1000 may acquire the target user's predicted correct answer rate information corresponding to at least one candidate question. The educational content recommendation device 1000 may arrange at least one candidate questions in order of average correct answer rate. In this case, the educational content recommendation device 1000 may acquire a reference candidate question on the basis of the predetermined reference correct answer rate. For example, the educational content recommendation device 1000 may acquire candidate questions having lower average correct answer rate information than the predetermined reference correct answer rate as reference candidate questions.

In the operation S4220 of calculating the target user's second ability information by comparing the target user's predicted correct answer rate information with the reference users' average correct answer rate information for the reference candidate question, the educational content recommendation device 1000 may calculate second ability information representing the target user's reasoning power on the basis of the reference users' average correct answer rate information for the reference candidate questions and the target user's predicted correct answer rate information for the reference candidate questions. For example, referring to FIG. 8, a first target user may show a higher predicted correct answer rate for the reference candidate questions than the reference users. In this case, the educational content recommendation device 1000 may acquire second ability information including a first reasoning power value for the first target user. On the other hand, a second target user of FIG. 8 may show a lower predicted correct answer rate for the reference candidate questions than the first target user. In this case, the educational content recommendation device 1000 may acquire second ability information including a second reasoning power value lower than the first reasoning power value for the second target user.

Meanwhile, the educational content recommendation device 1000 may calculate second ability information related to the target user's reasoning power on the basis of the target user's predicted correct answer rate information and the reference users' average correct answer rate information. For example, the educational content recommendation device 1000 may calculate the target user's second ability information on the basis of the integral value of the reference users' average correct answer rate for the reference candidate questions and the integral value of the target user's correct answer rate for the reference candidate questions. As a specific example, when the integral value of the target user's predicted correct answer rate for the reference candidate questions has a first value and the integral value of the reference users' average correct answer rate for the reference candidate questions has a second value, the target user's second ability information may be calculated on the basis of the first value and the second value. Specifically, the educational content recommendation device 1000 may quantify the target user's second ability information on the basis of the difference between the first value and the second value. Since the first target user of FIG. 8 has a greater difference between the first value and the second value than the second target user of FIG. 8, the educational content recommendation device 1000 may calculate the first target user's second ability information to be higher than the second target user's second ability information.

FIGS. 7 and 8 have been mainly described with a process of acquiring candidate questions having information on an average correct answer rate lower than a reference correct answer rate as reference candidate questions and quantifying second ability information by comparing predicted correct answer rate information with average correct answer rate information for the reference candidate questions. However, this is merely exemplary for the convenience of description, and the method of acquiring second ability information may be configured to acquire candidate questions having information on average correct answer rate higher than the reference correct answer rate as reference candidate questions and quantify second ability information related to a target user's reasoning power on the basis of predicted correct answer rate information and average correct answer rate information for the reference candidate questions. As another example, the method of acquiring second ability information may be implemented to give a first weight to candidate questions having an average correct answer rate lower than the reference correct answer rate, give a second weight to candidate questions having an average correct answer rate higher than the reference correct answer rate, and calculate the target user's second ability information. For these operations, the reference correct answer rate may be set in advance.

As another example, the educational content recommendation device 1000 may quantify third ability information representing the target user's logical ability on the basis of the target user's predicted correct answer rate information for the candidate questions and the reference users' average correct answer rate information for the candidate questions. The third ability information representing the target user's logical ability may be quantified in a similar way to the above-described second ability information representing the reasoning power. For example, the educational content recommendation device 1000 may quantify third ability information by comparing the reference users' average correct answer rate with the target user's predicted correct answer rate for the reference candidate questions. Specifically, when the educational content recommendation device 1000 acquires information that the target user's predicted correct answer rate is higher than the average correct answer rate for the reference candidate questions, the educational content recommendation device 1000 may quantify the target user's logical ability to be relatively high. In this case, similarly to the above-described method, the target user's third ability information may be calculated on the basis of the integral value of the reference users' average correct answer rate for the reference candidate questions and the integral value of the target user's predicted correct answer rate for the reference candidate questions.

As another example, the educational content recommendation device 1000 may quantify fourth ability information representing the target user's application ability on the basis of the target user's predicted correct answer rate information for the candidate questions and the reference users' average correct answer rate information for the candidate questions. The fourth ability information representing the target user's application ability may be quantified in a similar way to the above-described second ability information representing the reasoning power. For example, the educational content recommendation device 1000 may quantify fourth ability information by comparing the reference users' average correct answer rate with the target user's predicted correct answer rate for the reference candidate questions. Specifically, when the educational content recommendation device 1000 acquires information that the target user's predicted correct answer rate is higher than the average correct answer rate for the reference candidate questions, the educational content recommendation device 1000 may quantify the target user's application ability to be relatively high. In this case, similarly to the above-described method, the target user's fourth ability information may be calculated on the basis of the integral value of the reference users' average correct answer rate for the reference candidate questions and the integral value of the target user's predicted correct answer rate for the reference candidate questions.

As another example, the educational content recommendation device 1000 may quantify fifth ability information representing the target user's basic academic ability on the basis of the target user's predicted correct answer rate information for the candidate questions and the reference users' average correct answer rate information for the candidate questions. The fifth ability information representing the target user's basic academic ability may be quantified in a similar way to the above-described second ability information representing the reasoning power. For example, the educational content recommendation device 1000 may quantify fifth ability information by comparing the reference users' average correct answer rate with the target user's predicted correct answer rate for the reference candidate questions. Here, the reference candidate questions used for quantifying the fifth ability information may be candidate questions having information on an average correct answer rate higher than the predetermined reference correct answer rate among candidate questions. Specifically, when the educational content recommendation device 1000 acquires information that the target user's predicted correct answer rate is higher than the average correct answer rate for the reference candidate questions, the educational content recommendation device 1000 may quantify the target user's basic academic ability to be relatively high. In this case, similarly to the above-described method, the target user's fifth ability information may be calculated on the basis of the integral value of the reference users' average correct answer rate for the reference candidate questions and the integral value of the target user's predicted correct answer rate for the reference candidate questions.

Meanwhile, an educational content recommendation device 1000 according to another exemplary embodiment of the present invention may assess or quantify a target user's grit on the basis of learning data. Specifically, the learning data may further include information on a learning time based on the user's login information. The educational content recommendation device 1000 may train a model for quantifying how long users will study, that is, grit, with information on learning times of the users. For example, the educational content recommendation device 1000 may train the model for quantifying a user's grit on the basis of information on a learning time and label information which gives a grit level to the information on the learning time. Also, the educational content recommendation device 1000 may be configured to calculate the target user's grit information using the trained model and information on a learning time of the target user.

Also, the educational content recommendation device 1000 according to the other exemplary embodiment of the present invention may assess or quantify the target user's concentration on the basis of the learning data. Specifically, the learning data may further include information on the learning time based on the user's login information. In particular, the educational content recommendation device 1000 may calculate information on a question-answering time on the basis of log data (e.g., the user's login information) included in the learning data. For example, the educational content recommendation device 1000 may train a model for acquiring information on a question-answering time on the basis of users' log data (e.g., the users' login information) and quantify the target user's concentration on the basis of the information on the question-answering time. Specifically, the educational content recommendation device 1000 may train a model for predicting a user's question-answering time information on the basis of log data and a user's actual question-answering time. Also, the educational content recommendation device 1000 may acquire question-answering time information from the target user's log data using the trained model and quantify the target user's concentration on the basis of the acquired question-answering time information. For example, the educational content recommendation device 1000 may be implemented to quantify the target user's concentration to be a higher value on the basis of a longer question-answering time.

Referring back to FIGS. 3 and 4, the method of recommending educational content according to the exemplary embodiment of the present invention may include the operation S5000 of acquiring the recommendation content.

In the operation S5000 of acquiring the recommendation content, the educational content recommendation device 1000 may determine recommendation content on the basis of the target user's ability information. For example, the educational content recommendation device 1000 may determine recommendation content on the basis of the target user's predicted correct answer rate information and/or ability information. The recommendation content may be a content set having the highest expected score that is calculated on the basis of the predicted correct answer rate information and/or the ability information and is related to the ability information. The expected score may be calculated by associating the target user's ability information with log data at a specific point included in the target user's learning data.

As an example, when first ability information related to the target user's maximum learning ability is acquired, the educational content recommendation device 1000 may calculate an expected score related to the target user's first ability information using the target user's predicted correct answer rate information, log data of the learning data with a specific point of which the first ability information is associated, etc., and determine that a first content set whose expected score is calculated to be the highest is recommendation content.

As another example, when second ability information related to the target user's reasoning power is acquired, the educational content recommendation device 1000 may calculate an expected score related to the target user's second ability information using the target user's predicted correct answer rate information, log data of the learning data with a specific point of which the second ability information is associated, etc., and determine that a second content set whose expected score is calculated to be the highest is recommendation content.

As still another example, when the target user's $N^{th}$ ability information (e.g., the logical ability and the application ability) is acquired, the educational content recommendation device 1000 may calculate an expected score related to the target user's $N^{th}$ ability information using the target user's predicted correct answer rate information, log data of the learning data with a specific point of which the $N^{th}$ ability information is associated, etc., and determine that an $N^{th}$ content set corresponding to the expected score which is calculated to be the highest is recommendation content.

To implement the above description, the operation S5000 of acquiring the recommendation content may include an operation of acquiring an educational content set, an operation of calculating a change in the ability information of the target user caused when content included in the educational content set is provided to the target user, and an operation of determining content which maximizes the change of the ability information as the recommendation content.

Meanwhile, the educational content recommendation device 1000 according to the exemplary embodiment of the present invention may be implemented to determine a neural network model on the basis of the ability information, distribute resources corresponding to the determined model, and acquire recommendation content through the determined neural network model. With these operations, the educational content recommendation device 1000 may appropriately distribute resources required for selecting educational content according to a target user's ability information such that the target user can be provided with educational content which maximizes an improvement in the user's ability. Also, the educational content recommendation device 1000 may appropriately distribute resources required for selecting educational content according to a target user's ability information such that the equity of education can be ensured.

Referring back to FIG. 4, although not shown in the drawing, the method of recommending educational content according to the exemplary embodiment of the present invention may further include an operation of transmitting the recommendation content. For example, the educational content recommendation device 1000 may transmit the recommendation content to the user terminal 100 through the transceiver 1100.

The educational content recommendation device 1000 according to the exemplary embodiment of the present invention may quantify basic abilities (e.g., a learning ability, reasoning power, a logical ability, an application ability, a basic academic ability, concentration, and grit) related to various types of learning and determine that educational content, which maximizes an expected score calculated for various types of abilities when the educational content is provided to a user, is recommendation content. In this way, the educational content recommendation device 1000 according to the exemplary embodiment of the present invention can provide educational content for training learning-related basic abilities to a user rather than for simply increasing a test score.

The above-described various operations of the educational content recommendation device 1000 may be stored in the memory 1200 of the educational content recommendation device 1000, and the controller 1300 of the educational content recommendation device 1000 may perform the stored operations.

The educational content recommendation method, device, and system according to the exemplary embodiments of the present invention determine educational content to be recommended to a user according to various ability types, and thus it is possible to provide educational content for training basic abilities, such as a learning ability, an application ability, and a logical ability, required for learning to the user.

Effects of the present invention are not limited to those described above, and other effects which have not been described above will be clearly understood by those of ordinary skill in the art from the specification and the accompanying drawings.

The features, structures, effects, etc. described in the exemplary embodiments are included in at least one embodiment of the present invention and are not necessarily limited to one embodiment. Further, the features, structures, effects, etc. described in each embodiment can be combined or modified in other embodiments by those of ordinary skill in the art to which the embodiments belong. Accordingly, content related to the combination and modification should be construed to be included in the scope of the present invention.

Although embodiments of the present invention have been described above, these are just examples and do not limit the present invention. The present invention can be modified and applied in various ways not illustrated above without departing from the essential features of the present invention by those of ordinary skill in the art. In other words, each element described in detail in the embodiments can be modified. Also, differences related to the modification and application should be construed as falling within the scope of the present invention, which is defined by the accompanying claims.

What is claimed is:

1. A computer-implemented method of recommending educational content by a device for analyzing learning data of a user, the device comprising a memory storing computer-readable instructions and a processor configured to execute the instructions to perform the method comprising:

acquiring, by the processor, learning data of a target user which includes log data including question data related to a question previously answered by the target user and answer data related to an answer of the target user to the question;

acquiring, by the processor, a question database including at least one candidate question and average correct answer rate information of reference users for the candidate question;

acquiring, by the processor, predicted correct answer rate information of the target user for the candidate question by executing an artificial neural network model on the basis of the candidate question and the learning data, the artificial neural network model consisting of a transformer-based artificial neural network, wherein the acquiring of the predicted correct answer rate information of the target user for the candidate question comprises calculating the predicted correct answer rate information of the target user by inputting candidate question information to an encoder of the transformer-based artificial neural network and inputting the learning data to a decoder of the transformer-based artificial neural network;

acquiring, by the processor, ability information of the target user related to at least some of the log data on the basis of the predicted correct answer rate information and the average correct answer rate information of the reference users for the candidate question, wherein the ability information is related to at least one of first ability information representing a maximum learning ability of the target user, second ability information representing reasoning power of the target user, third ability information representing a logical ability of the target user, and fourth ability information representing an application ability of the target user, and wherein the acquiring of the ability information comprises acquiring the first ability information representing the maximum learning ability of the target user;

generating, by the processor, an educational content set by associating the first ability information of the target user with data at a specific point of the log data included in the learning data; and determining, by the processor, the educational content set as recommendation content, wherein the acquiring of the first ability information of the target user comprises:

(i) predicting, by the processor, a learning ability value of the target user by using a trained neural network model, (ii) generating, by the processor, growth curve data indicating a change in the predicted learning ability value of the target user over time on the basis of the learning data and the predicted correct answer rate information, (iii) performing, by the processor, a derivative operation on the growth curve data to acquire rate-of-change information of the growth curve data, (iv) acquiring, by the processor, target rate-of-change information having a rate of change smaller than or equal to a predetermined threshold rate of change at a time point on the growth curve data on the basis of the rate-of-change information, and (v) acquiring, by the processor, the predicted learning ability value at the time point on the growth curve data, as the first ability information representing the maximum learning ability of the target user corresponding to the target rate-of-change information.

2. The method of claim 1, wherein the acquiring of the ability information of the target user comprises comparing the average correct answer rate information for the candidate question with the predicted correct answer rate information of the target user for the candidate question to acquire the second ability information of the target user.

3. The method of claim 2, wherein the acquiring of the second ability information of the target user comprises:

acquiring a reference candidate question having an average correct answer rate lower than or equal to a predetermined reference correct answer rate; and comparing the predicted correct answer rate information of the target user for the reference candidate question with the average correct answer rate information for the reference candidate question to calculate the second ability information of the target user.

4. The method of claim 1, wherein the determining of the recommendation content comprises:

calculating a predicted change in the ability information of the target user caused when content included in the educational content set is provided to the target user; and determining that the content which maximizes a predicted change in the ability information is the recommendation content.

5. A non-transitory computer-readable recording medium in which a computer program executed by a computer is recorded, the computer program comprising:

acquiring learning data of a target user which includes log data including question data related to a question previously answered by the target user and answer data related to an answer of the target user to the question;

acquiring a question database including at least one candidate question and average correct answer rate information of reference users for the candidate question;

acquiring predicted correct answer rate information of the target user for the candidate question by executing an artificial neural network model on the basis of the candidate question and the learning data, the artificial neural network model consisting of a transformer-based artificial neural network, wherein the acquiring of the predicted correct answer rate information of the target user for the candidate question comprises calculating the predicted correct answer rate information of the target user by inputting candidate question information to an encoder of the transformer-based artificial neural network and inputting the learning data toa decoder of the transformer-based artificial neural network;

acquiring ability information of the target user related to at least some of the log data on the basis of the predicted correct answer rate information and the average correct answer rate information of the reference users for the candidate question, wherein the ability information is related to at least one of first ability information representing a maximum learning ability of the target user, second ability information representing reasoning power of the target user, third ability information representing a logical ability of the target user, and fourth ability information representing an application ability of the target user, and wherein the acquiring of the ability information comprises acquiring the first ability information representing the maximum learning ability of the target user;

generating an educational content set by associating the first ability information of the target user with data at a specific point of the log data included in the learning data; and determining the educational content set as recommendation content, wherein the acquiring of the first ability information of the target user comprises:

(i) predicting a learning ability value of the target user by using a trained neural network model, (ii) generating growth curve data indicating a change in the predicted learning ability value of the target user over time on the basis of the learning data and the predicted correct answer rate information, (iii) performing a derivative operation on the growth curve data to acquire rate-of-change information of the growth curve, (iv) acquiring target rate-of-change information having a rate of change smaller than or equal to a predetermined threshold rate of change at a time point on the growth curve data on the basis of the rate-of-change information, and (v) acquiring the predicted learning ability value at the time point on the growth curve data as the first ability information representing the maximum learning ability of the target use corresponding to the target rate-of-change information.

6. A device for recommending educational content by receiving learning data of a user from an external user terminal, the device comprising:

a transceiver configured to communicate with the user terminal; and a controller configured to acquire learning data of a target user through the transceiver and calculate learning ability of the target user on the basis of the learning data, wherein the controller is further configured to:

acquire the learning data of the target user which includes log data including question data related to a question previously answered by the target user and answer data related to an answer of the target user to the question, acquire a question database including at least one candidate question and average correct answer rate information of reference users for the candidate question, acquire predicted correct answer rate information of the target user for the candidate question by executing an artificial neural network model on the basis of the candidate question and the learning data, the artificial neural network model consisting of a transformer-based artificial neural network, wherein the controller is further configured to calculate the predicted correct answer rate information of the target user by inputting candidate question information to an encoder of the transformer-based artificial neural network and inputting the learning data to a decoder of the transformer-based artificial neural network, acquire ability information of the target user related to at least some of the log data on the basis of the predicted correct answer rate information and the average correct answer rate information of the reference users for the candidate question, wherein the ability information is related to at least one of first ability information representing a maximum learning ability of the target user, second ability information representing reasoning power of the target user, third ability information representing a logical ability of the target user, and fourth ability information representing an application ability of the target user, and wherein the acquiring of the ability information comprises acquiring the first ability information representing the maximum learning ability of the target user, generate an educational content set by associating the first ability information of the target user with data at a specific point of the log data included in the learning data, and determine the educational content set as recommendation content, wherein the controller is further configured to:

(i) predict a learning ability value of the target user by using a trained neural network model, (ii) generate growth curve data indicating a change in the predicted learning ability value of the target user over time on the basis of the learning data and the predicted correct answer rate information, (iii) perform a derivative operation on the growth curve data to acquire rate-of-change information of the growth curve data, (iv) acquire target rate-of-change information having a rate of change smaller than or equal to a predetermined threshold rate of change at a time point on the growth curve data on the basis of the rate-of-change information, and (v) acquire the predicted learning ability value at the time point on the growth curve data as the first ability information representing the maximum learning ability of the target user corresponding to the target rate-of-change information.

7. The device of claim 6, wherein the controller is further configured to compare the average correct answer rate information for the candidate question with predicted correct answer rate information of the target user for the candidate question to acquire the second ability information of the target user.

8. The device of claim 7, wherein the controller is further configured to acquire a reference candidate question having an average correct answer rate lower than or equal to a predetermined reference correct answer rate and compare the predicted correct answer rate information of the target user for the reference candidate question with the average correct answer rate information for the reference candidate question to calculate the second ability information of the target user.

9. The device of claim 6, wherein the controller is further configured to calculate a predicted change in the ability information of the target user caused when content included in the educational content set is provided to the target user, and determine that the content which maximizes a predicted change in the ability information is the recommendation content.

* * * * *